(12) United States Patent
Xiang et al.

(10) Patent No.: US 11,952,507 B2
(45) Date of Patent: Apr. 9, 2024

(54) METHOD OF CONSTRUCTING SOLID SLIPPERY SURFACE

(71) Applicant: Anhui University of Technology, Ma'an Shan (CN)

(72) Inventors: Tengfei Xiang, Ma'an Shan (CN); Depeng Chen, Ma'an Shan (CN); Zhong Lv, Ma'an Shan (CN)

(73) Assignee: Anhui University of Technology, Ma'an Shan (CN)

( * ) Notice: Subject to any disclaimer, the term of this patent is extended or adjusted under 35 U.S.C. 154(b) by 0 days.

(21) Appl. No.: 18/454,858

(22) Filed: Aug. 24, 2023

(65) Prior Publication Data
US 2024/0067834 A1   Feb. 29, 2024

(30) Foreign Application Priority Data

Aug. 25, 2022 (CN) .......................... 2022110232368

(51) Int. Cl.
| | | |
|---|---|---|
| *C09D 5/16* | (2006.01) | |
| *C09D 7/40* | (2018.01) | |
| *C09D 7/62* | (2018.01) | |
| *C09D 191/08* | (2006.01) | |
| *C25D 11/34* | (2006.01) | |

(52) U.S. Cl.
CPC ......... *C09D 5/1656* (2013.01); *C09D 5/1693* (2013.01); *C09D 7/62* (2018.01); *C09D 7/67* (2018.01); *C09D 191/08* (2013.01); *C25D 11/34* (2013.01)

(58) Field of Classification Search
None
See application file for complete search history.

(56) References Cited

FOREIGN PATENT DOCUMENTS

| CN | 107551275 A | | 1/2018 | |
|---|---|---|---|---|
| CN | 107964396 A | * | 4/2018 | ............. B82Y 30/00 |
| CN | 107964396 A | | 4/2018 | |
| CN | 108587575 A | * | 9/2018 | ............. C09K 5/063 |
| CN | 109438747 A | * | 3/2019 | ................ C08J 5/18 |
| CN | 109438747 A | | 3/2019 | |

* cited by examiner

*Primary Examiner* — Louis J Rufo
(74) *Attorney, Agent, or Firm* — Nitin Kaushik

(57) ABSTRACT

The present invention discloses a method of constructing a solid slippery surface, belonging to the technical field of preparation of lubricating materials. The method of constructing a solid slippery surface comprises (1) constructing a metal oxide coating on the surface of a metal substrate by anodic oxidation, and then modifying the metal oxide coating using a low surface energy material to afford a superhydrophobic coating; and (2) fulling mixing photothermal nanoparticles and solid paraffin, followed by infusing the mixture onto the surface of the superhydrophobic coating to afford the solid slippery surface. The preparation method of the present invention is performed in a simple process and is environmentally friendly. The solid slippery surface constructed in the present invention has excellent photothermal and anti-icing performance, making some improvements in the field of copper metal anti-icing.

5 Claims, 12 Drawing Sheets

METHOD OF CONSTRUCTING SOLID SLIPPERY SURFACE

CROSS-REFERENCE TO RELATED APPLICATIONS

The application claims priority to Chinese patent application No. 2022110232368, filed on Aug. 25, 2022, the entire contents of which are incorporated herein by reference.

TECHNICAL FIELD

The present invention relates to the technical field of preparation of slippery materials, in particular a method of constructing a solid slippery surface.

BACKGROUND

Metal surfaces inevitably suffer from frosting and icing at low temperatures, which are problems across the world. At present, active anti-icing means are mostly adopted, that is, anti-icing/de-icing is carried out by spraying salt particles or heating.

These conventional methods have low practice efficiency and cannot fundamentally solve the problems. So far, the most effective methods of preventing ice disaster are mainly passive methods, including electrothermal methods, mechanical vibration methods, ultrasonic methods, etc. Although they can solve the icing problem to some extent, these methods are confronted with problems, such as complex design, high energy consumption, high processing cost, and serious mechanical fatigue damage of materials.

In recent decades, with the development of nanotechnology and biomimetic technology, people have proposed and studied the superhydrophobic and slippery anti-icing coating technology without other energy consumption under ideal application conditions. However, superhydrophobic surface structures are applied in limited areas due to drawbacks such as weak condensation resistance and poor mechanical stability; and lubricants on ordinary slippery surfaces are prone to depletion, are hardly stored, lack active de-icing properties and have other problems, which significantly impede applications of slippery surfaces.

SUMMARY

The object of the present invention is to provide a method of constructing a solid slippery surface, thereby solving the existing problems in the prior art.

To achieve this object, the present invention provides the following solutions:

A first technical solution of the present invention is a method of constructing a solid slippery surface, comprising:
(1) constructing a metal oxide coating on the surface of a metal substrate by anodic oxidation, and then modifying the metal oxide coating using a low surface energy material to afford a superhydrophobic coating;
wherein the superhydrophobic coating reduces the surface energy of the surface, so that a lubricant (a mixture of photothermal nanoparticles and solid paraffin) has a higher bond strength with the structure, and it can infuse into a rough structure perfectly; in short, the lubricant has better infusion effect through superhydrophobic modification; and
(2) fully mixing photothermal nanoparticles and solid paraffin, followed by infusing the mixture into the as-prepared superhydrophobic coating to afford said solid slippery surface (a solid slippery surface for photothermal deicing).

Further, said metal substrate comprises copper metal, aluminum metal, an aluminum alloy, magnesium metal, or a magnesium alloy.

Further, said photothermal nanoparticles are graphene oxide-supported ferric oxide nanoparticles.

Further, a process of preparing said photothermal nanoparticles specifically comprises adding a mixture solution of a ferric salt and a ferrous salt in a graphene oxide solution, adjusting the pH value to alkaline after mixing, stirring the mixture for reaction, separating a precipitate to afford said photothermal nanoparticles (graphene oxide-supported ferric oxide nanoparticles).

Further, a mass ratio of the ferric salt to the ferrous salt in said mixture solution is 5-9:3; said ferric salt is $FeCl_3$; said ferrous salt is $FeCl_2$; a ratio of the total mass of the ferric salt and the ferrous salt in said mixture solution to the mass of graphene oxide in the graphene oxide solution is 15-50:1.

Further, the time of said stirring is 30-60 min.

Further, a mass ratio of photothermal nanoparticles to solid paraffin is 3-10:100.

Further, said step of fully mixing is performed at a temperature of 62-68° C.

Furthermore, an electrolyte used in said anodic oxidation is a sodium hydroxide solution; said sodium hydroxide solution has a concentration of 1-3 mot/L.

Furthermore, said anodic oxidation is performed at a temperature of 20° C. for 15 min at a current density of 2 $mA/cm^2$.

Furthermore, said low surface energy material is a 1 wt % fluorosilane-ethanol solution.

A second technical solution of the present invention relates to a solid slippery surface constructed by the abovementioned method of constructing a solid slippery surface.

A third technical solution of the present invention relates to use of the abovementioned solid slippery surface in the preparation of a photothermal deicing coating.

The present invention discloses the following technical effects:
(1) The solid slippery surface prepared in the present invention has a photothermal deicing effect, retains in a solid state at room temperature, is not prone to have a dissipation loss, and is convenient for transportation and storage.
(2) Graphene oxide-supported ferric oxide nanoparticles used in the present invention greatly reduces the freezing point of the superlubric surface, and delays the time of freezing at the same time.
(3) The solid slippery surface for photothermal deicing prepared in the present invention has excellent photothermal performance.
(4) The photothermal solid slippery coating prepared in the present invention has excellent anti-icing performance in various low-temperature environments.
(5) The photothermal solid slippery coating prepared in the present invention has photothermal deicing performance.
(6) The preparation method of the present invention is characterized by simple and controllable process, low cost and environmental protection.
(7) By remote illumination the solid slippery surface prepared in the present invention would, on the one hand, change a lubricant from a solid state to a liquid state under the photothermal effect and reduce the adhesion strength of ice on the surface, so that ice slides off; on the other hand, ice would also melt under the photothermal effect, thereby achieving in-situ deicing.

BRIEF DESCRIPTION OF DRAWINGS

To illustrate the technical solutions in the examples of the present invention or in the prior art more clearly, the accompanying drawings required for describing the examples are briefly described below. Apparently, the accompanying drawings in the following descriptions show merely some examples of the present invention, and a person of ordinary skill in the art may still derive other drawings from these accompanying drawings without inventive efforts.

DETAILED DESCRIPTION OF THE EMBODIMENTS

Figure 1:
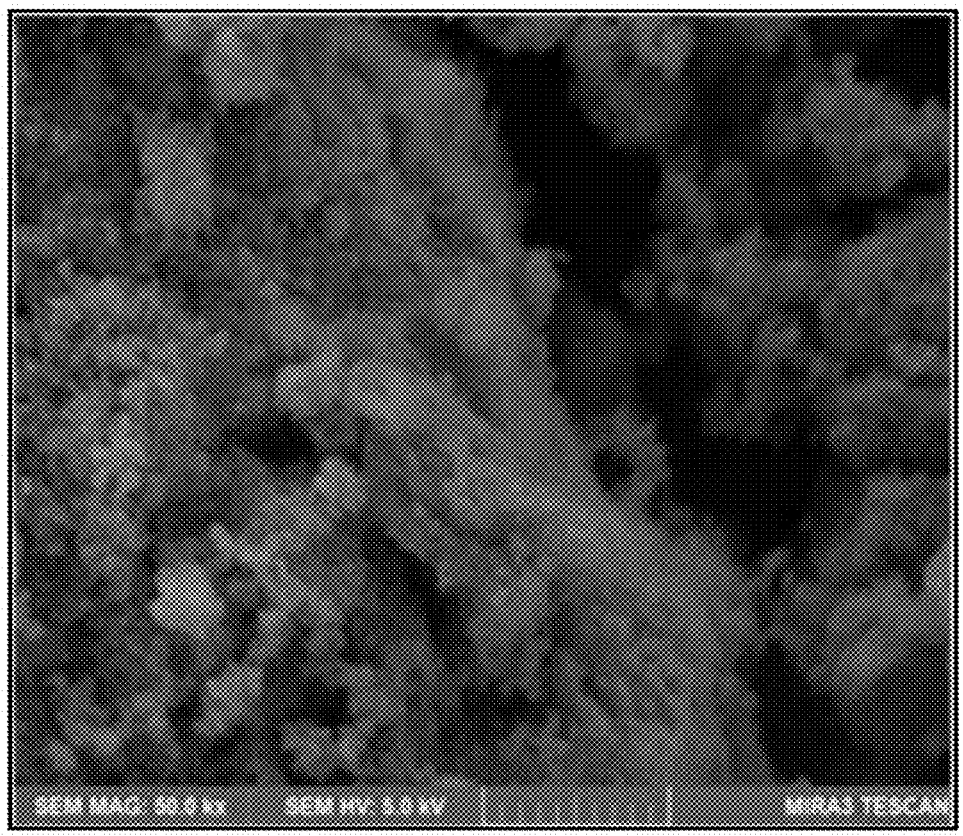
FIG. 1 is a SEM image of photothermal nanoparticles prepared in Example 1 of the present invention.

A variety of exemplary embodiments of the present invention are described herein in detail. These descriptions in detail should not be construed as limitations to the present invention, but as more specific descriptions of some aspects, features, and embodiments of the present invention.

It should be understood that the terms used in the present invention are only for describing particular embodiments, rather than limiting the present invention. In addition, where a range of values is provided in the present invention, it should be understood that each intervening value between the upper and lower limits of that range is also specifically disclosed. Each smaller range between any stated value or intervening value in a stated range and any other stated or intervening value in that stated range is encompassed within the present invention. The upper and lower limits of these smaller ranges may independently be included or excluded in the range.

Unless defined otherwise, all technical and scientific terms used herein have the same meaning as commonly understood by one of ordinary skill in the art to which the present invention belongs. Although the present invention only describes some preferred methods and materials, any methods and materials similar or equivalent to those described herein can also be used in the practice or testing ofthe present invention. All literatures mentioned in the specification are incorporated herein by reference to disclose and describe the methods and/or materials in connection with the literatures. In the case of conflicting with any incorporated literature, the contents of this specification shall prevail.

Without departing from the scope or spirit of the present invention, improvements and changes can be made to the specific embodiments in the specification of the present invention, which is obvious to persons of ordinary skill in the art. Other embodiments obtained from the specification of the present invention are obvious to persons of ordinary skill in the art. The specification and examples of the present application are merely exemplary.

As used herein, "including," "comprising," "having," "containing" and the like are open-ended languages, indicating including but not limited to.

Example 1

A method of constructing a solid slippery surface comprises:
(1) Pretreatment of a metal substrate: a copper plate was subjected to degreasing (using a degreasing solution to remove oil), pickling (using dilute hydrochloric acid having a concentration of 125 mL/L), and ultrasonic washing in ethanol to afford a pretreated copper plate (with grease and impurities removed from the metal surface);

Preparation of a degreasing solution: In 100 mL of deionized water were added and dissolved 2.5 g sodium hydroxide, 3.5 g sodium phosphate, 3.5 g sodium carbonate and 2.5 g sodium silicate to afford a degreasing solution.

(2) Preparation of a copper metal surface CuO layer; the pretreated copper plate was used as an anode, an unpretreated copper plate as a cathode, and a 2 mol/L sodium hydroxide solution as an electrolyte to carry out anodic oxidation (the anode and the cathode were connected to the positive and negative electrodes of a power supply through a wire; the power supply was a DC power supply at a current density of 2 mA/cm$^2$; anodic oxidation was performed at a temperature of 20° C. for 15 min). After anodic oxidation was completed, the pretreated copper plate was rinsed with deionized water to afford a copper plate having a Cu(OH)$_2$ surface, which was then oxidized in an oven at 180° C. for 2 h to afford a CuO surface (a metal oxide surface) with a "nanoneedle" multiscale micro-nano structure.

Preparation of a sodium hydroxide solution: In a beaker were added 300 mL deionized water and 40 g sodium hydroxide; after dissolving, deionized water was added to the 500 mL mark to afford a sodium hydroxide solution.

(3) Preparation of a superhydrophobic coating: The copperplate having a CuO surface prepared in step (2) was placed and immersed in a 1 wt % fluorosilane-ethanol solution for modification for 2 h, then washed with deionized water, placed in an oven at 60° C., and dried for 2 h to afford a superhydrophobic coating (an anti-icing superhydrophobic coating).

(4) Preparation of a solid slippery surface: After being mixed at a mass ratio of 1:10, photothermal nanoparticles ($Fe_3O_4$@GO photothermal nanoparticles) and solid paraffin were ultrasonically dispersed and mixed (fully mixed) at 65° C. for 2 h until dispersed uniformly, then evenly infused (in a thickness of 2 μm and an amount of 20 μL) onto the surface of the superhydrophobic coating prepared in step (3), and air-dried at room temperature, to afford a solid slippery surface (a solid slippery surface for photothermal deicing).

Preparation of photothermal nanoparticles: 0.1 g Graphene oxide were weighed and placed in 100 mL distilled water for ultrasonic dispersion for 1 h to afford an aqueous solution of graphene oxide. 2 g $FeCl_3$ and 0.75 g $FeCl_2$ were placed in 125 mL distilled water and stirred for 30 min to afford a mixture solution of iron salts. The mixture solution of iron salts was slowly poured into and fully mixed with the aqueous solution of graphene oxide, and then added with 15 mL of 25% ammonia water, which quickly adjusted the pH of the mixture solution to around 10. The mixture was stirred for 45 min, and cooled to room temperature followed by separating a precipitate using magnetic separation. The precipitate was washed with distilled water and absolute ethanol before drying in an oven at 60° C. for 10 h, and ground to a particle size of 80 nm to afford photothermal nanoparticles (graphene oxide-supported ferric oxide nanoparticles). The SEM image is shown in FIG. 1, the EDS image is shown in FIG. 2.

Figure 2:
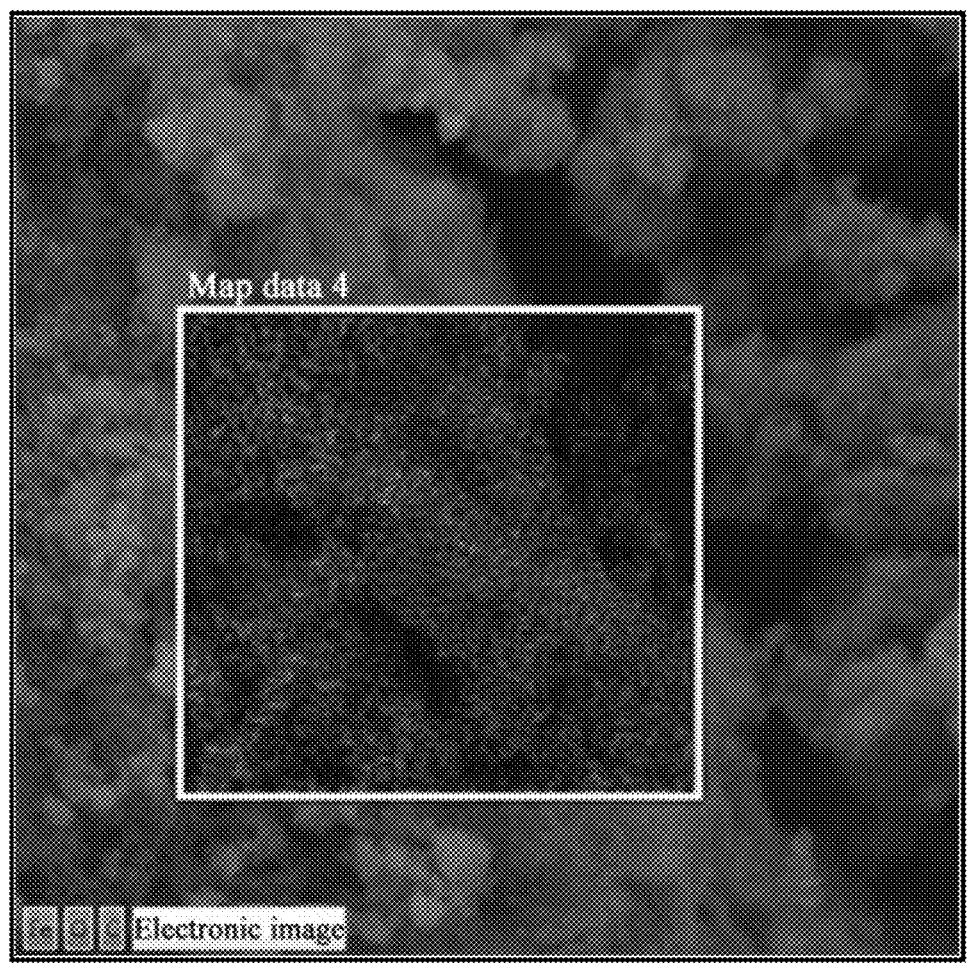
FIG. 2 is an EDS image of photothermal nanoparticles prepared in Example 1 of the present invention.

FIG. 1 and FIG. 2 show that ferric oxide nanoparticles adhere to the surface of graphene oxide, demonstrating the successful preparation of graphene oxide-supported ferric oxide.

Figure 3:
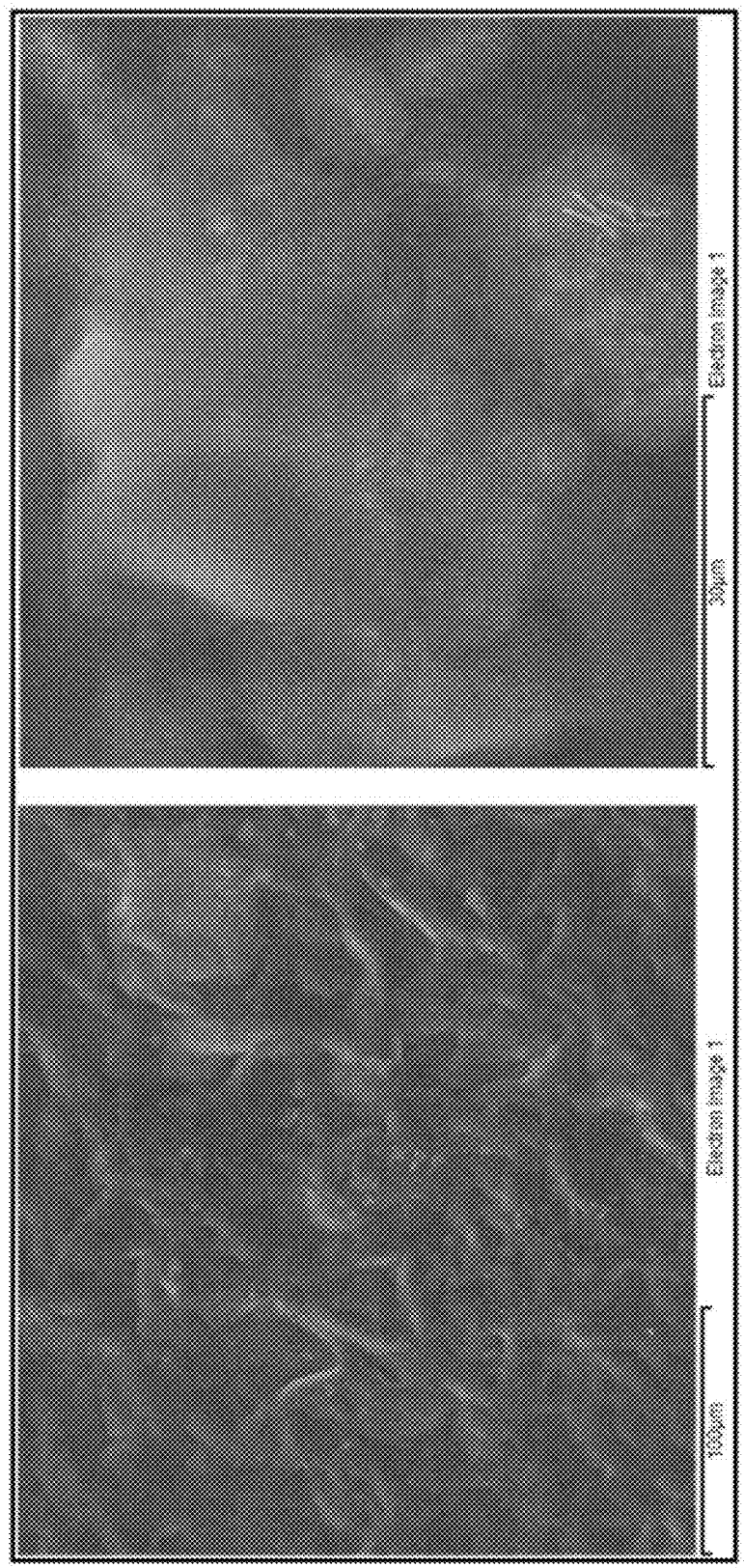
FIG. 3 shows SEM images of the solid slippery surface prepared in Example 1 of the present invention, wherein the left image is zoomed in by 500 times, and the right image is zoomed in by 2000 times.

FIG. 3 shows SEM images of the solid slippery surface prepared in this example (the left image in a scale bar of 100 μm, and the right image 30 μm), suggesting that the graphene oxide-supported ferric oxide nanoparticles are coated by paraffin.

Figure 4:
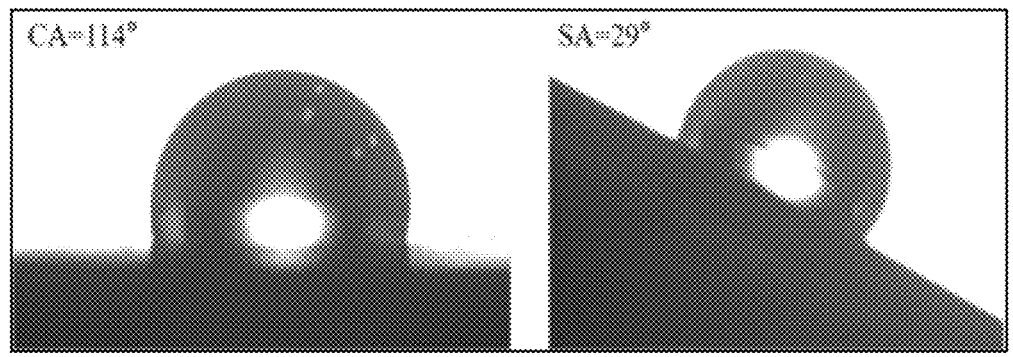
FIG. 4 is a diagram showing dynamic and static wetting properties of the solid slippery surface prepared in Example 1 of the present invention.

FIG. 4 is a diagram showing dynamic and static wetting properties of the solid slippery surface prepared in this example. It is seen from the drawing that the solid slippery surface prepared in this example has a water contact angle of 114° and a sliding angle of 29°.

Figure 5:
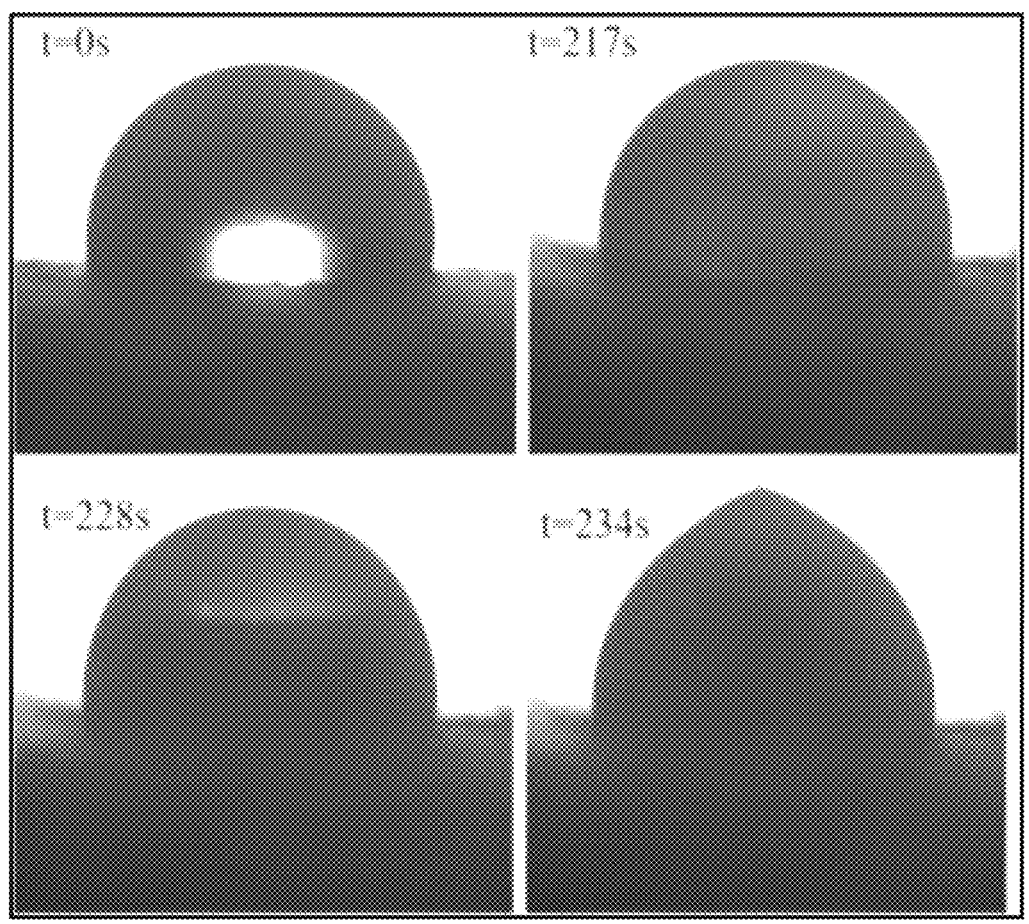
FIG. 5 shows images demonstrating anti-icing performance test results of the solid slippery surface prepared in Example 1 of the present invention.

FIG. 5 shows images demonstrating anti-icing performance test results of the solid slippery surface prepared in this example. A refrigeration equipment and a contact angle goniometer system are used to observe the anti-icing performance of the surface. The experiment was carried out at room temperature. When the refrigeration equipment lowered the temperature to the target temperature (−10° C.), the sample was placed on the sample stage, and 10 μL of water was dropped onto the surface of the sample using a microneedle. A high-speed camera was used to record the morphology of water droplets at different times, and observe the freezing conditions of the solid slippery sample in a low-temperature environment in real time. It is demonstrated that the solid slippery surface still has good anti-icing performance at −10° C., and the freezing time can be delayed up to 234 s.

Figure 6:
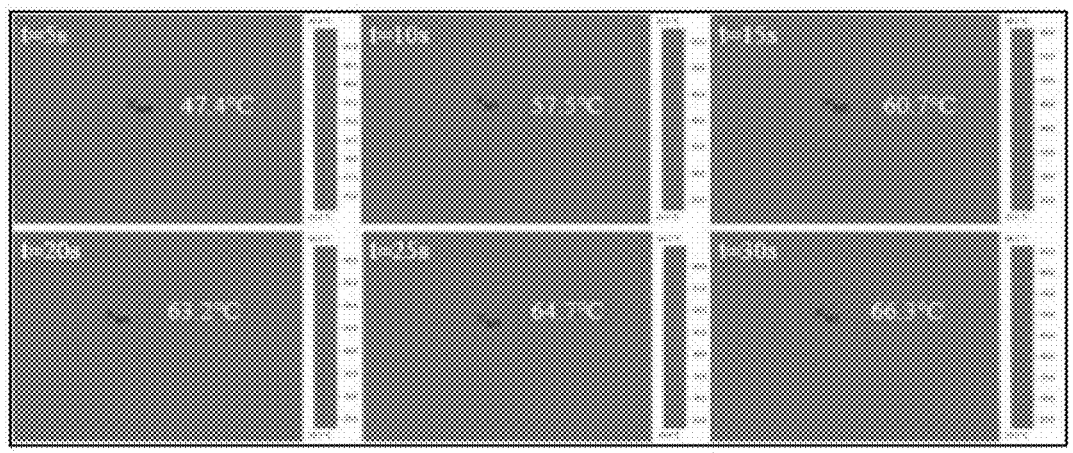
FIG. 6 shows images demonstrating photothermal performance test results of the solid slippery surface prepared in Example 1 of the present invention.

FIG. 6 shows images demonstrating photothermal performance test results of the solid slippery surface prepared in this example. The solid slippery surface was irradiated with a laser. The experiment was carried out at room temperature. When the surface was irradiated with a laser for 5 s, the surface temperature immediately rose to 47.4° C., and continued to rise to 66.3° C. in the next 25 s. It is demonstrated that the solid slippery surface has excellent photothermal performance.

Figure 7:
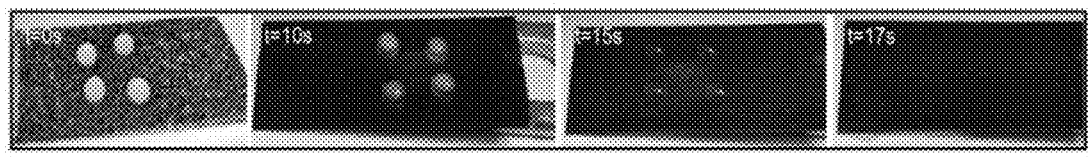
FIG. 7 shows images demonstrating photothermal deicing performance test results of the solid slippery surface prepared in Example 1 of the present invention.

FIG. 7 shows images demonstrating photothermal deicing performance test results of the solid slippery surface prepared in this example. When water was completely frozen and formed frozen droplets on the solid slippery surface, it only took 15 s for the frozen droplets to completely meh under laser irradiation, and start to slide off from the solid slippery surface.

Example 2

Example 2 was conducted in the same process as Example 1, except that in step (4) photothermal nanoparticles were mixed with solid paraffin at a mass ratio of 3:100.

Figure 8:
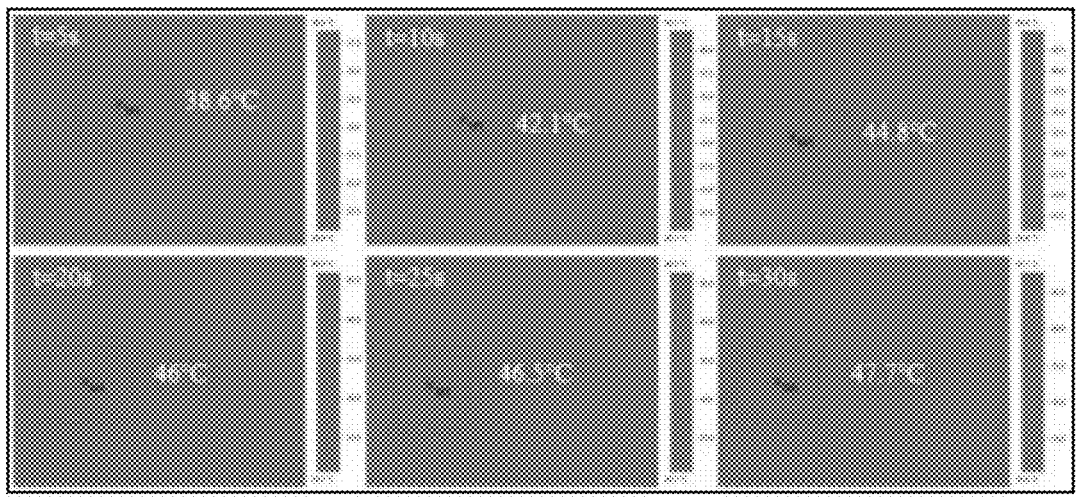
FIG. 8 shows images demonstrating photothermal performance test results of the solid slippery surface prepared in Example 2 of the present invention.
Figure 9:
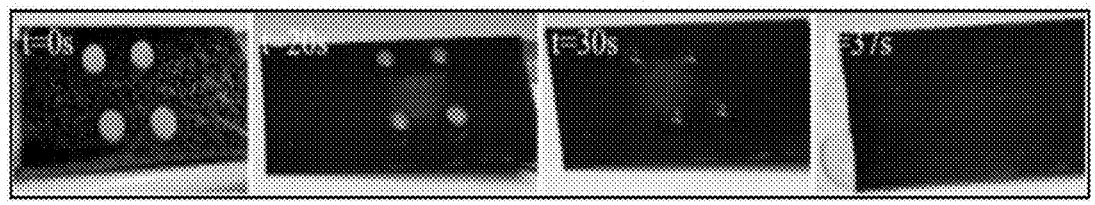
FIG. 9 shows images demonstrating photothermal deicing performance test results of the solid slippery surface prepared in Example 2 of the present invention.

Images demonstrating photothermal performance test results of the solid slippery surface prepared in this example are shown in FIG. 8, and images demonstrating photothermal deicing performance test result are shown in FIG. 9.

The temperature reached 47.7° C. after the solid slippery surface prepared in this example was exposed to laser irradiation for 30 s; the frozen droplets started to slide off after 37 s of laser irradiation.

Example 3

Example 3 was conducted in the same process as Example 1, except that in step (4) photothermal nanoparticles were mixed with solid paraffin at a mass ratio of 5:100.

Figure 10:
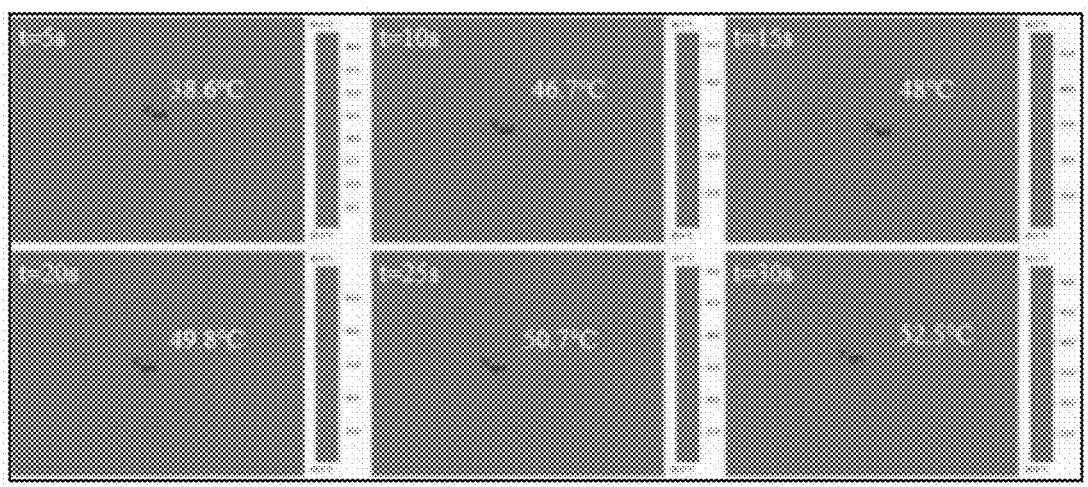
FIG. 10 shows images demonstrating photothermal performance test results of the solid slippery surface prepared in Example 3 of the present invention.
Figure 11:
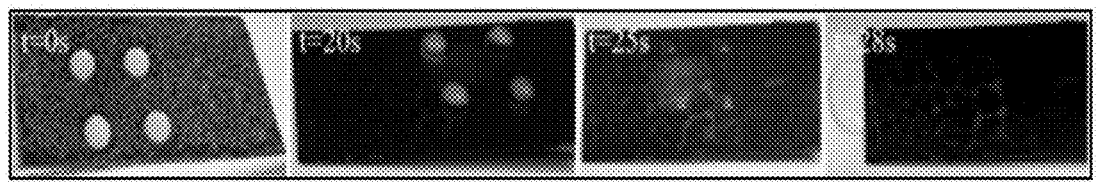
FIG. 11 shows images demonstrating photothermal deicing performance test results of the solid slippery surface prepared in Example 3 of the present invention.

Images demonstrating photothermal performance test results of the solid slippery surface prepared in this example are shown in FIG. 10, and images demonstrating photothermal deicing performance test results are shown in FIG. 11.

The temperature reached 52.5° C. after the solid superlubric surface prepared in this example was exposed to laser irradiation for 30 s; the frozen droplets started to slide off after 28 s of laser irradiation.

Example 4

Example 4 was conducted in the same process as Example 1, except that in step (4) $FeCl_3$ was in an amount of 1.0 g, $FeCl_2$ in an amount of 0.6 g, and graphene oxide in an amount of 0.107 g.

The temperature reached 62.3° C. after the solid slippery surface prepared in this example was exposed to laser irradiation for 30 s; the frozen droplets started to slide off after 25 s of laser irradiation.

Example 5

Example 5 was conducted in the same process as Example 1, except that in step (4) $FeCl_3$ was in an amount of 0.9 g, $FeCl_2$ in an amount of 0.3 g, and graphene oxide in an amount of 0.08 g.

The temperature reached 54.5° C. after the solid slippery surface prepared in this example was exposed to laser irradiation for 30 s; the frozen droplets started to slide off after 35 s of laser irradiation.

Comparative Example 1

The superlubric surface prepared according to the reference literature Slippery liquid-infused porous surface (SLIPS) with superior liquid repellency, anti-corrosion, anti-icing and intensified durability for protecting substrates was prepared in the following process:
(1) mixing natural attapulgite and octadecyltrimethoxysilane evenly in ethanol to form solution A, then adding inorganic aluminum phosphate to the above mixture solution and stirring evenly to form solution B;
(2) spraying solution B onto a magnesium alloy substrate and drying at 120° C. to afford a superhydrophobic surface; and
(3) infusing silicone oil to a superhydrophobic porous structure at last to afford a slippery surface.

It is found that the prepared coating is volatile, and hardly withstands the flushing of running water in particular, so that the coating easily loses its function and has stability far lower than the solid slippery coating prepared in the present invention.

Effect Example 1

The slippery coating (a conventional slippery coating) infused with liquid polydimethylsiloxane (PDMS) was compared with the solid slippery coating (infused with PDMS/paraffin) in Example 1 of present invention. The results are shown in FIG. 12.

Figure 12:
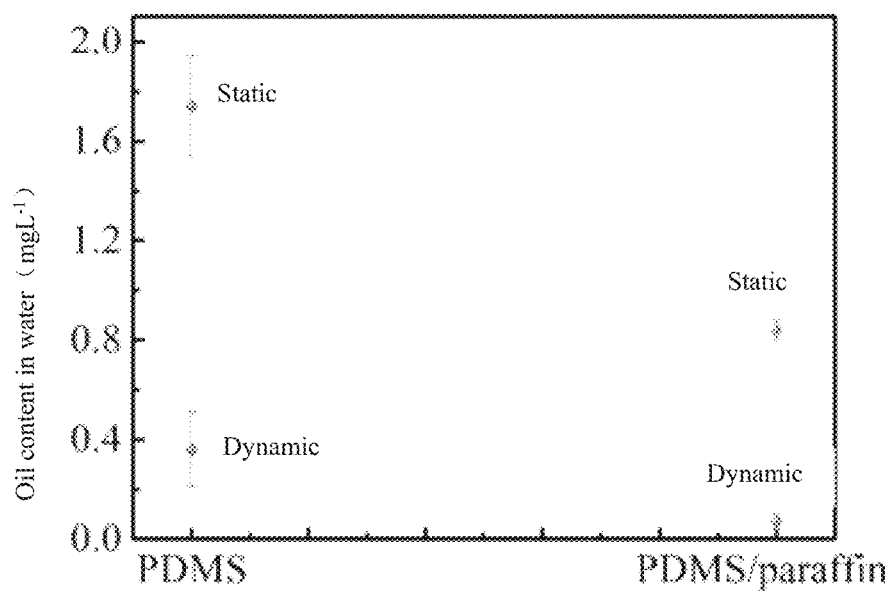
FIG. 12 is an effect diagram demonstrating stability assay of conventional slippery coating and the solid superlubric coating prepared in the present invention.

FIG. 12 suggests that the polydimethylsiloxane/paraffin (PDMS/paraffin)-infused solid slippery coating prepared in the present invention has a lower lubricating oil content in water than conventional slippery coatings as measured by UV-vis technology, when either immersed in a static environment or flushed in a dynamic environment.

The above-mentioned examples are merely preferred embodiments of the present invention, and shall not be construed as limitation to the scope of the present invention. Under the premise of not departing from the design spirit of the present invention, any variations and improvements made by a person of ordinary skill in the art to the technical solutions of the present invention shall fall within the protection scope determined by the claims of the present invention.

What is claimed is:

1. A method of constructing a solid slippery surface, comprising:
   (1) constructing a metal oxide coating on the surface of a metal substrate by anodic oxidation, and then modifying the metal oxide coating using a low surface energy material to afford a superhydrophobic coating; and
   (2) fulling mixing photothermal nanoparticles and solid paraffin, followed by infusing the mixture onto the surface of said superhydrophobic coating to afford said solid slippery surface;
   wherein said photothermal nanoparticles are graphene oxide-supported ferric oxide nanoparticles;
   wherein a process of preparing said photothermal nanoparticles specifically comprises adding a mixture solution of a ferric salt and a ferrous salt in a graphene oxide solution, adjusting the pH value to alkaline after mixing, stirring the mixture for reaction, separating a precipitate to afford said photothermal nanoparticles; and
   wherein a mass ratio of the ferric salt to the ferrous salt in said mixture solution is 5-9:3; said ferric salt is $FeCl_3$; said ferrous salt is $FeCl_2$; and a ratio of the total mass of the ferric salt and the ferrous salt in said mixture solution to the mass of graphene oxide in the graphene oxide solution is 15-50:1.

2. The method of constructing a solid slippery surface according to claim 1, characterized in that said metal substrate comprises copper metal, aluminum metal, an aluminum alloy, magnesium metal, or a magnesium alloy.

3. The method of constructing a solid slippery surface according to claim 1, characterized in that the time of said stirring is 30-60 min.

4. The method of constructing a solid superlubric surface according to claim 1, characterized in that a mass ratio of photothermal nanoparticles to solid paraffin is 3-10:100.

5. The method of constructing a solid slippery surface according to claim 1, characterized in that said step of fully mixing is performed at a temperature of 62-68° C.

* * * * *